United States Patent [19]
Dunkelman

[11] 3,964,378
[45] June 22, 1976

[54] TILTING FRYPAN WITH DRAIN SYSTEM

[75] Inventor: Robert L. Dunkelman, Shreveport, La.

[73] Assignee: The Frymaster Corporation, Shreveport, La.

[22] Filed: Mar. 22, 1974

[21] Appl. No.: 453,767

[52] U.S. Cl. .................................. 99/425; 99/375; 99/407; 99/446
[51] Int. Cl.² ............................................. A47J 37/10
[58] Field of Search ..................... 99/446, 339–340, 99/372–373, 375, 396, 407, 423–424, 425, 444–445; 222/160, 162–163, 164, 166; 239/428.5, 569; 285/8, 168, 181

[56] References Cited
UNITED STATES PATENTS

| | | | |
|---|---|---|---|
| 2,962,226 | 11/1960 | Goodrie | 239/428.5 |
| 3,211,344 | 10/1965 | Ekman et al. | 222/166 |
| 3,498,211 | 3/1970 | Atkins | 99/446 X |
| 3,558,163 | 1/1971 | Moore et al. | 285/168 |
| 3,719,507 | 3/1973 | Bardeau | 99/375 |
| 3,756,140 | 9/1973 | Kolivas | 99/446 X |
| 3,797,377 | 3/1974 | Lotter et al. | 99/424 X |

Primary Examiner—Peter Feldman
Assistant Examiner—Arthur O. Henderson
Attorney, Agent, or Firm—Hubbard, Thurman, Turner & Tucker

[57] ABSTRACT

A frypan cooking system is provided with a tilting mechanism to rotate the frypan forward and pour cooking fluid or cleaning water through a pouring lip on the frypan rim. A drain pan is removably mounted in front of the frypan in a fixed position beneath the edge of the pouring lip as a surge reservoir to receive the discharged liquid. The pivotal axis of the frypan is positioned in front of the frypan near the front rim and in alignment with the outer edge of the pouring lip so that the lip is maintained in a position overlapping the edge of the drain pan as the frypan is rotated. The drain pan has an outlet in the bottom connected to a swivel spout for directing the discharged liquid to an external reservoir or to a floor drain through extension tubing. An alternate embodiment includes a telescoping drain chute which can be extended to substantially encompass the end of the pouring lip and direct discharged liquid to a surge reservoir which in turn outlets the liquid to a floor drain.

9 Claims, 5 Drawing Figures

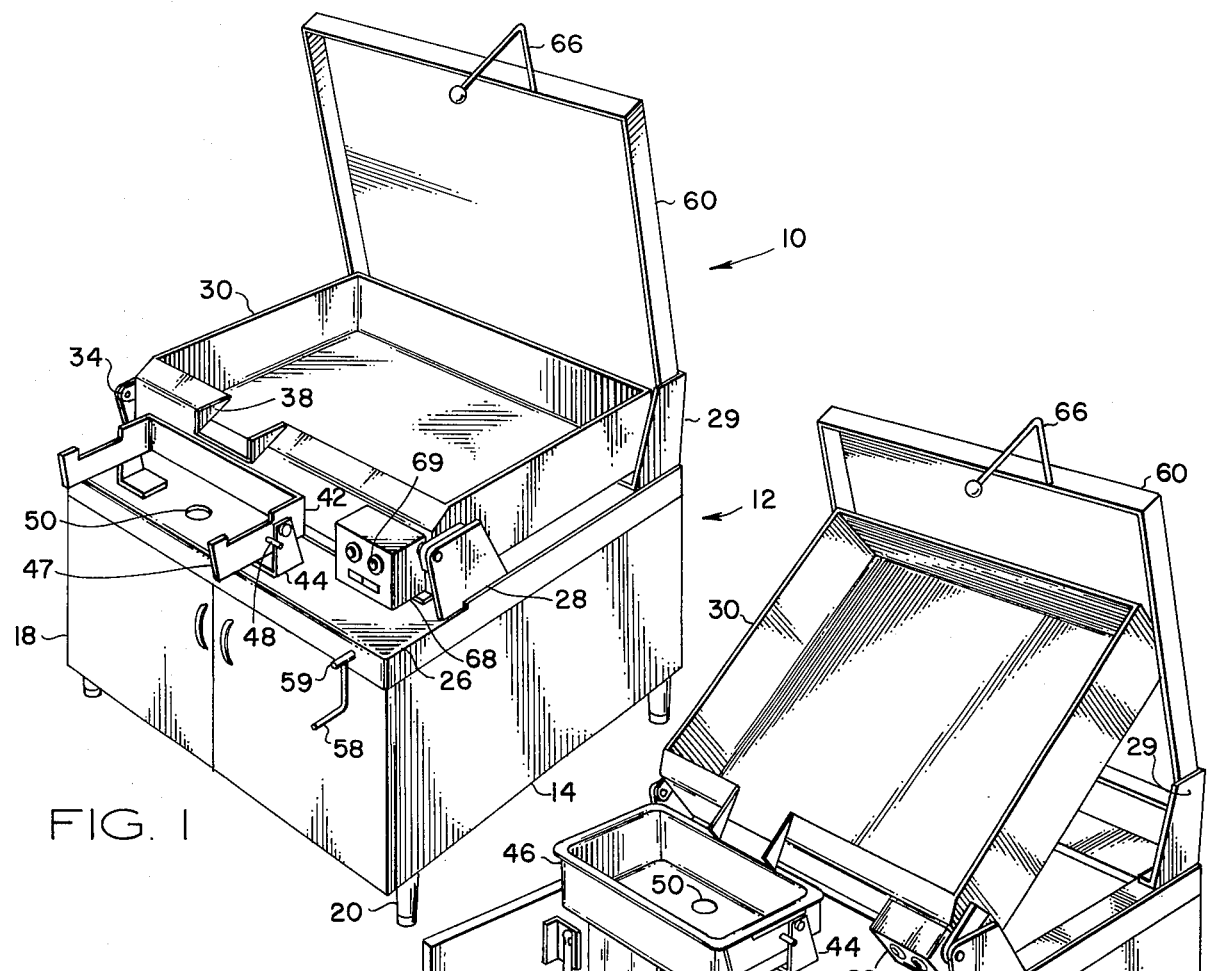
FIG. 1
FIG. 2
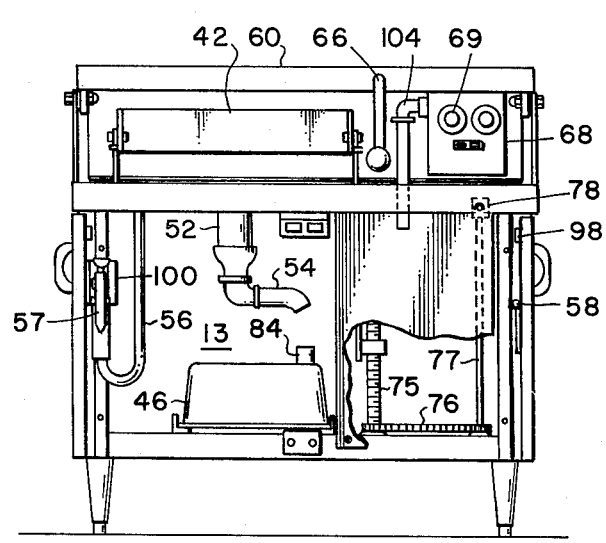
FIG. 4

TILTING FRYPAN WITH DRAIN SYSTEM

BACKGROUND AND SUMMARY OF THE INVENTION

The invention relates to a tilting cooking system, and more particularly to a tilting frypan having a system for draining liquid from the frypan.

Cooking systems used in preparing large quantities of food normally have included a large cooking vessel which must be periodically drained and cleaned. Various means have been provided for raising and tilting the cooking vessel to pour used cooking fluid or cleaning water into an adjacent reservoir, such as a drain pan, which had to be carried to a sink and emptied. Usually the drain pan needed to be filled and emptied several times to remove the contents of the larger cooking vessel. Moreover, complex mechanisms were required to maintain the top of the vessel and the reservoir in close proximity during the pouring operation.

The present invention provides for a simplified and convenient system of tilting and draining the fluid contents of a cooking vessel. The vessel is pivotally mounted in a support housing and is provided with a pouring lip along its rim to direct the poured fluid. Tilting apparatus is mounted beneath the frypan to rotate the vessel around its pivot point. Flow means are provided adjacent the frypan to receive the discharged fluid from the pouring lip and direct it to an external outlet.

In accordance with another aspect of the present invention, a frypan is pivotally supported by a freestanding cabinet and has a pouring spout integral with the frypan rim. A tilting mechanism mounted beneath the frypan elevates and rotates the frypan about a pivotal axis to pour liquid through the pour spout to a surge reservoir. The pivotal axis is located to maintain the pouring spout in a position overlapping the edge of the surge reservoir during pouring. A swivel spout is connected to an outlet in the bottom of the surge reservoir and directs the discharged water to an external drainage container in front of the cabinet or to a floor drain by way of flexible drain tubing.

In accordance with another aspect of the present invention, a frypan is pivotally mounted in supporting structure having means for tilting the frypan to discharge its liquid contents. A pouring lip is provided near the rim of the frypan. A telescoping drain tube is vertically mounted on the supporting structure below the pouring lip, and may be extended to the pouring lip or retracted into the supporting structure. The pivotal axis of the frypan is positioned to maintain the extended vertical drain tube in a substantially encompassing relationship with the end of the pouring lip while the frypan is being tilted. The drain tube directs the discharged liquid to a storage reservoir in the supporting structure to a floor drain having an outlet.

In accordance with a further aspect of the present invention, a pan holder is provided on a structure supporting a tiltable frypan with a pouring spout. A cafeteria pan is removably supported within the holder adjacent the frypan for temporarily containing food products before and after frying. A drain pan having an outlet in the bottom is supported in the holder in place of the cafeteria pan to receive the liquid contents of the frypan when tilted. An outlet in the bottom of the drain pan is connected to a drain pipe to direct discharged liquid to a storage reservoir or an external outlet. Both the cafeteria pan and the drain pan may be removed and the pan holder may be pivoted to a vertical position to allow an operator closer access to the frypan.

DESCRIPTION OF THE DRAWINGS

For a more complete understanding of the invention and for further objects and advantages thereof, reference is made to the following detailed description of the preferred embodiments taken in conjunction with the accompanying drawings wherein FIG. 1 is a perspective view of a tilting frypan cooking system incorporating the present invention with the frypan in lowered position.

FIG. 2 is a perspective view of the cooking system of FIG. 1 with the frypan in tilted position.

FIG. 4 is a cut-away front view of the cooking system of FIG. 1 with the frypan in lowered position.

DETAILED DESCRIPTION OF THE PREFERRED EMBODIMENT

Figure 3:
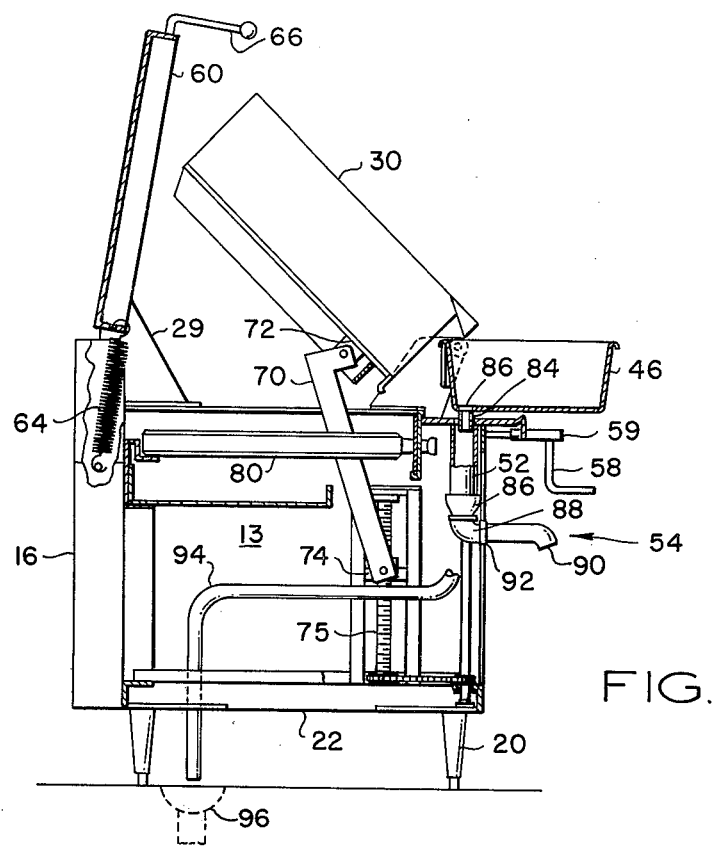
FIG. 3 is a cut-away side view of the cooking system of FIG. 1 with the frypan in tilted position.

Referring now to FIGS. 1 and 2, a cooking system 10 is shown incorporating the present invention. The system includes a housing 12 having an enclosure 13 formed by side panels 14, a back panel 16, bottom panel 22 and two hinged cabinet doors 18 attached to the front of the housing 12. Four legs 20 extend downward from bottom panel 22 to support housing 12.

A supporting framework 24 is mounted on a top panel 26 of housing 12. Framework 24 includes four corner brackets 28 and 29 extending vertically upward from top panel 26 near the corners of top panel 26. A large frypan 30 is horizontally positioned within the four corner brackets 28 and 29 on top of housing 12. Frypan 30 is pivotally connected to the front two corner brackets 28 by pivot bolts 32 which extend through a hole in each of the two front corner brackets 28 and through frypan extensions 34 projecting from the front of frypan 30. The front wall 36 of frypan 30 is angled inward near the top of the wall to partially shield against splattering grease. One portion of wall 36 forms a pouring lip 38 which is cut lower than the rest of wall 36 and extends outward in front of frypan 30.

A pan holder 40 is mounted on top panel 26 in front of frypan 30. Pan holder 40 comprises a U-shaped metal bracket 42 horizontally mounted on panel 26 by two vertically extending support brackets 44 which in turn are fastened to top panel 26. As shown in FIG. 2, U-shaped bracket 42 is sized to accept and partially support a drain pan 46 in a horizontal position on top panel 26 adjacent frypan 30. Drain pan 46 is positioned sufficiently close to frypan 30 that pouring lip 38 overlaps one side of pan 46. An extension arm 47 is rotatably mounted to each of support brackets 44 and extends horizontally forward in alignment with an arm of bracket 42. A stop pin 48 is mounted on the outside of each extension arm 47 to rest against one of the support brackets 44 and support each arm 47 in a horizontal position. Alternately, drain pan 46 may be replaced by a conventional cafeteria pan used for temporarily holding food before or after frying in frypan 30. During draining and cleaning of frypan 30, drain pan 46 is used, with a vertical outlet in the bottom as will be described later. An aperture 50 extends through panel 26 within the area of panel 26 surrounded by U-shaped bracket 42. Aperture 50 is in alignment with a drain pipe 52 vertically mounted beneath top panel 26 within enclosure 13 and terminating in a swivel spout 54. A spray hose 56 terminating in a spray nozzle 57 and connected to a suitable water source (not shown) extends from within enclosure 13 to connect to the inside of one of the front doors 18.

A handle 58 extends outward from the bottom portion of top panel 26 in front of housing 12 and is rotatable to tilt frypan 30 into its raised position as shown in FIG. 2. Frypan extensions 34, connected to front corner brackets 28, position frypan 30 behind the pivotal axis so that pouring lip 38 is maintained in an overlapping relationship with drain pan 46 while the frypan is being tilted. A pan cover 60, shown in raised position, is pivotally attached to top panel 26 by the two back corner brackets 29 on either side of the back portion of panel 26. Two springs 64 inside each of brackets 29 are connected between the back of pan cover 60 and top panel 26 to provide a counter balance for cover 60. An L-shaped handle 66 is connected to and extends downward from the front of pan cover 60 for raising the cover.

Referring now to FIG. 3, a side view of cooking system 10 is shown with one of side panels 14 cut away. The frypan 30 is shown in tilted position, supported by a lifter arm 70 attached to the frypan 30 by bracket 72. Lifter arm 70 extends downward to attach at its other end to a ball nut 74 positioned on a threaded rod 75 vertically mounted in enclosure 13. Threaded rod 75 is rotated by a chain drive 76 shown in FIG. 4 which in turn is driven by a drive rod 77 extending vertically to the top of enclosure 13. A gear box 78 connects crank handle 58 via a handle extension 59 to drive rod 77. Heating elements 80, preferably gas burners of a conventional type, lie horizontally beneath frypan 30. A control box 68 is connected to the front wall 36 of frypan 30 next to pan holder 40 containing thermostat controls 69 for the heating elements 80 beneath frypan 30. In an alternate preferred embodiment, elements 80 are electrical heating elements affixed to the bottom of frypan 30 and having a flexible power cord connected thereto.

Drain pan 46 comprises a surge reservoir for receiving liquid poured from tilting frypan 30 through pouring lip 38. An outlet pipe 84 attached to drain pan 46 extends vertically downward from a hole 86 in the bottom of drain pan 46 through aperture 50 in top panel 26 and into drain pipe 52. Swivel spout 54, connected to the bottom of drain pipe 52, includes a reducer attachment 86 which in turn is attached to an elbow pipe 88. Finally, a spout pipe 90 is attached to elbow pipe 88 by a threaded circumferential connector 92.

A flexible hose 94 is shown within housing 13 for connecting to swivel spout 54 when it has been rotated to discharge liquid backward into the enclosure 13. Hose 94 extends to a floor drain 96 located beneath bottom panel 22 of housing 12. Swivel spout 54 may also be rotated forward to direct liquid in front of housing 12 into a drainage can (not shown).

With reference to FIG. 4, drain pan 46 is shown in storage inverted on the interior floor 82 of enclosure 13. Crank handle 58 has been removed from handle extension 59 and placed in a handle holder 98 inside of right front door 18. Left front door 18 is provided with an attachment 100 for holding spray hose 56 and spray nozzle 57 when not in use. An upper door stop 102 extends vertically downward from top panel 26 to stop front doors 18 in closed position. A leader pipe 104 is shown extending from control box 68 downward into enclosure 13 to burner units 80. L-shaped handle 66 projects in front of front wall 36 of frypan 30, since cover 60 is in a closed position.

In operation, frypan 30 is cleaned, with cooking liquid, heating elements 80 are actuated and the thermostat controls in control box 68 are set. During the cooking operation the cafeteria pan is normally placed within pan holder 40 for temporarily holding food before and after frying in frypan 30. Pan cover 60 is normally lowered over the top of frypan 30 to prevent splattering of grease. When the frypan 30 is to be emptied and cleansed, burners 80 are shut off and the cooking fluid is allowed to partially cool. Pan cover 60 is raised and crank handle 58 is then rotated to tilt frypan 30 forward and pour the cooking liquid into drain pan 46 connecting to swivel spout 54. Preferably, spout 54 is rotated to direct the cooking fluid into an external drainage can for proper disposal, to avoid smearing the floor or clogging the floor drain with cooking grease.

After the cooking liquid has been substantially drained, frypan 30 is returned to its lowered horizontal position and spray nozzle 57 is disconnected from holder 100 and used to spray frypan 30 with water. A suitable detergent may also be used as needed. After the frypan 30 has been thoroughly cleaned, frypan 30 is again tilted upward draining the cleaning water into drain pan 68. Swivel spout 54 is preferably rotated to direct the cleaning water through flexible tubing 94 to floor drain 96.

It is understood that other reservoir means may be used to receive water from swivel spout 54. For example, a large tank may be positioned within enclosure 13 for receiving the cleaning water which may later be drained through a suitable outlet.

Figure 5:
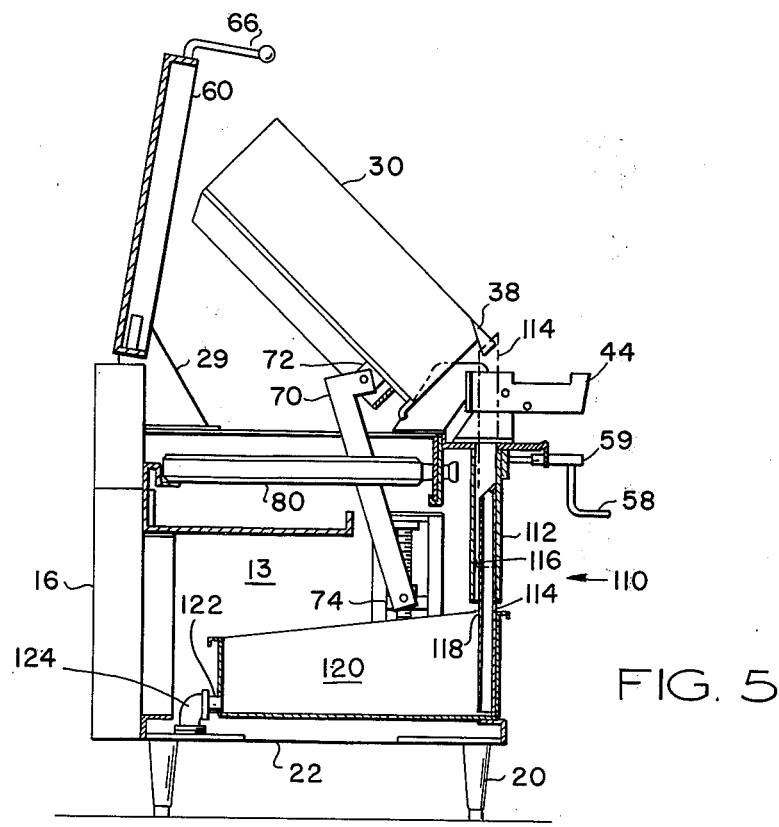
FIG. 5 is a cut-away side view of a cooking system incorporating an alternate preferred embodiment of the present invention.

With reference to FIG. 5, cooking system 10 is shown with an alternate preferred drain system. A drain chute assembly 110 is mounted inside the front doors 18 of enclosure 13. Drain chute assembly 110 includes a drain chute guide 112 mounted to extend vertically downward from top panel 26. A drain chute 114 reciprocates telescopically within drain chute guide 112 between an extended and retracted position. In the extended position (dotted lines) drain chute 114 is supported at its lower end by a chute catch 116 mounted inside drain chute guide 112. In this position drain chute 114 extends upward through an aperture 118 in top panel 26 to surround the end of pouring lip 38 of frypan 30. The top end of drain chute 114 terminates at an angle of about 45 degrees in order to closely encompass pouring lip 38 in the fully extended position. A drain pan 120 having a top aperture 118 in alignment with drain chute 113 is supported near the bottom of enclosure 13. An outlet nipple 122 extends from the bottom back of drain pan 120 and connects to an elbow pipe 124 which is curved to direct discharged fluid through a hole in bottom panel 22 to floor drain 96.

When not in use, drain chute 114 is released from chute catch 116 and retracted within drain chute guide 112. The lower portion of drain chute 114 extends through aperture 118 and rests on the bottom of drain pan 120.

In operation, a cafeteria pan is placed in pan holder 40 to assist in processing food during the frying operation. During the cleaning procedure, crank handle 58 is rotated to tilt frypan 30 forward by means of lifter arm 70. The cafeteria pan has been removed and extension arms 47 of pan holder 40 are pivoted vertically to allow the operator to stand in closer proximity to housing 12. Drain chute 114 is pulled upward into its extended position supported by chute catch 116. As frypan 30 is tilted forward, cooking fluid is poured into drain chute 114 and flows directly to drain pan 120 which acts as a surge reservoir. The discharged fluid in turn flows through nipple 122 and into a floor drain (not shown). After the cleaning operation is completed, drain chute 114 is retracted within chute guide 112 and frypan 30 is lowered to its horizontal position with pan cover 60 lying horizontally over frypan 30. Cooking system 10 is then ready for further frying activities.

It is understood from the foregoing description that the cooking system of the present invention presents several important advantages over other systems. A compact and efficient system is provided for repeated frying of various foods. A pan holder adjacent the frypan supports a cafeteria pan during the cooking operation and a drain pan when the frypan is being emptied and cleaned. A drain system is provided which conveniently disposes of used cooking fluid and cleaning water. A tilting mechanism rotates the frypan about a pivotal axis in front of the frypan to maintain the frypan pouring spout overlapping with the drain pan to prevent spilling or splattering of the liquid discharged from the frypan.

The drain pan acts as a surge reservoir to prevent overflow as the liquid is poured from the frypan. The swivel spout connected beneath the frypan allows discharge of the used fluid to an external container, an internal reservoir or through flow tubing to a floor drain. The draining operation is thus greatly simplified and improved.

An alternate system provides a telescoping drain chute which may be extended to receive discharged liquid from the pouring spout and in turn direct the liquid to a surge reservoir having an outlet to the floor drain. When the system is not in use, the drain chute may be retracted within the housing so as not to encumber the cooking operation.

Although particular embodiments of the invention have been illustrated in the accompanying drawings and described in the foregoing detailed description, it will be understood that the invention is not limited to the embodiments disclosed, but is capable of rearrangement, modification and substitution without departing from the spirit of the invention.

What is claimed is:

1. A tilting frypan apparatus comprising in combination:
   a free-standing cabinet having a support frame mounted above said cabinet;
   a frypan pivotally mounted on said support frame with brackets spacing said frypan from a pivotal axis extending in front of said frypan and parallel to the front side thereof;
   means for tilting said frypan about said axis forward toward the front of said cabinet;
   a pouring lip integral with the front rim of said frypan and forming a continuous channel extending forward from the front side of said frypan to a point above said axis to pour out fluid from said frypan;
   a drain pan having a fluid outlet in the bottom and removably mounted in front of said frypan to substantially instantaneously receive a substantial surge of said fluid in said frypan as said frypan is tilted, a side of said drain pan adjacent to said frypan disposed between said axis and said front side of said frypan with said pouring lip overlying said drain pan side; and
   a swivel drain spout in communication with said fluid outlet to selectively direct the fluid discharged from the drain pan to a storage reservoir or to a floor drain.

2. A tilting frypan apparatus comprising, in combination:
   a free-standing support housing;
   a frypan pivotally mounted on said housing and having a pouring spout on the upper rim of said frypan;
   means for rotating the frypan about a pivotal axis to pour liquid through said pouring spout, including bracket means attached to said frypan for spacing said frypan from said pivotal axis;
   a surge reservoir mounted adjacent said frypan with one side of said reservoir disposed between said pivotal axis and one side of said frypan, said pouring spout forming a continuous channel extending from said one side of said frypan to a point substantially above said pivotal axis to overlap said one side of said reservoir; and
   flow means communicating between said reservoir and an external outlet;
   whereby said frypan is rotated to pour a substantial surge of said liquid into said reservoir with said spout overlapping said one side of said reservoir and pivoting about said pivotal axis without substantial translational motion.

3. The apparatus of claim 2 and further comprising a flexible hose connected to said support housing and in communication with a water supply and having a manually actuated spray nozzle for selectively spraying said frypan with water to clean said frypan.

4. The apparatus of claim 2 wherein said flow means comprises a swivel spout being rotatable to discharge said liquid selectively to a drain pan or to a floor drain.

5. The apparatus of claim 2 wherein said surge reservoir comprises a drain pan having a liquid outlet in the bottom of said drain pan in communication with said flow means.

6. The apparatus of claim 2 and further comprising a rotatable cover pivotally mounted on said housing above said frypan to lie horizontally over said frypan while cooking and to pivot upward away from said frypan in a circular direction opposite the direction of frypan tilting when said cover is lifted off said frypan.

7. The apparatus of claim 2 wherein said flow means comprises a discharge outlet in the bottom of said surge reservoir, a drain flue vertically mounted beneath said discharge outlet for communicating the discharged liquid downward from said surge reservoir via said liquid outlet, and a swivel spout in communication with said drain flue for selectively directing the discharged liquid to a container or to said external outlet.

8. The apparatus of claim 2 wherein said bracket means comprises a plurality of extension members each pivotally connected between said frypan and said support housing to provide a space bounded by said frypan, said extension members and said pivotal axis, said pouring spout extending from said frypan into said space, and said surge reservoir positioned partially in said space with said pouring spout overlapping said one side of said reservoir.

9. A tilting frypan apparatus comprising, in combination:
a free-standing support housing;
a frypan pivotally mounted on said housing and having a pouring spout integral with the upper rim of said frypan;
means for rotating the frypan about a pivotal axis to pour liquid through said pouring spout;
discharge means for receiving said poured liquid and communicating said liquid to an external outlet, said discharge means comprising a horizontal surge reservoir removably mounted adjacent said frypan so that said pouring spout extends over one side of said reservoir, and flow means communicating between said reservoir and said external outlet; and
bracket means mounted on said housing for removably positioning alternately said surge reservoir or a cafeteria pan adjacent said frypan, said bracket means being rotatably mounted for swiveling to a vertical position when both said surge reservoir and said cafeteria pan are removed.

* * * * *